Feb. 22, 1927. 1,618,918
A. E. DAVIS
LOCOMOTIVE OR HAULING APPARATUS FOR RAILWAYS AND TRAMWAYS
Filed April 6, 1926
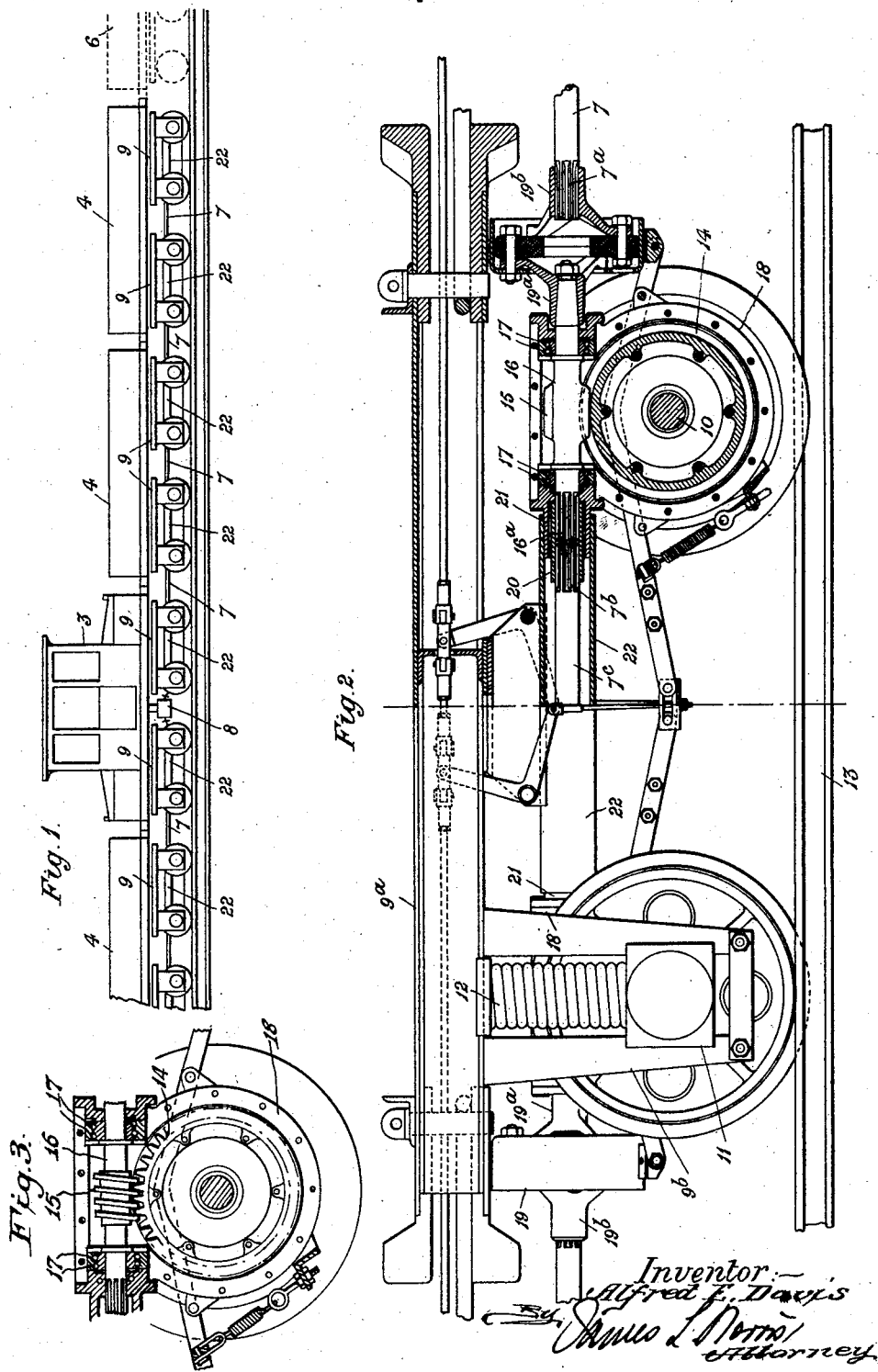

Patented Feb. 22, 1927.

1,618,918

UNITED STATES PATENT OFFICE.

ALFRED EDWIN DAVIS, OF BIRMINGHAM, ENGLAND.

LOCOMOTIVE OR HAULING APPARATUS FOR RAILWAYS AND TRAMWAYS.

Application filed April 6, 1926, Serial No. 100,130, and in Great Britain March 7, 1925.

This invention has reference to improvements in or relating to locomotives or hauling apparatus for railways and tramways and relates particularly to locomotives or hauling apparatus of the kind comprising a power vehicle and a plurality of haulage vehicles the axles of each of which are adapted to be driven from a common member in operative connection with the power unit.

In connection with locomotives or hauling apparatus for railways and tramways it is well known that there is a limitation to the power that can be efficiently utilized by the driving axles of a locomotive or the like and that this factor is especially serious in connection with light railways and tramways in that it militates against the employment of a locomotive or the like capable of exerting a tractive effort consonant with the power developed. For example, in connection with light railways or tramways employing a fourteen pound rail it is found that it is not possible, having due regard to mechanical efficiency, to transmit more than six horse power to each axle at three miles per hour, and since the axle loading is also limited by the strength of the rail, it will be appreciated that it is extremely difficult to obtain a tractive effort to accord with an economical utilization of the power available.

The present invention has for its object the provision of an improved locomotive or hauling apparatus for railways and tramways which admits of the efficient utilization of the power available whereby a tractive effort according to requirements may be readily and efficiently obtained.

The invention consists of a locomotive or hauling apparatus, of the kind hereinbefore referred to, for use on railways and tramways wherein each haulage unit incorporates one or more pony or bogie trucks of which the axles are interconnected through a section of a common driving member adapted for connection to the sections of the driving member connecting the axles to the co-operating pony or bogie trucks or to the power unit, universal couplings being interposed in the several sections of the driving member to facilitate the negotiation of curves and bends, means also being provided for permitting a differential displacement of the axles due to the different track conditions of the wheels. The invention further resides in the details of construction of the haulage units or pony trucks.

The invention will now be described with particular reference to the accompanying sheet of drawings, wherein:—

Figure 1 is a diagrammatic illustration of a locomotive or hauling apparatus embodying the invention for use on light railways, Figure 2 is a part sectional side elevation of one of the pony trucks, and Figure 3 is a sectional detail view of the driving gear of one of the pony trucks.

Referring more particularly to Figure 1, the locomotive or hauling apparatus comprises a power car 3 in which is contained the common power unit, for example, an internal-combustion engine, and four independent and interchangeable haulage units 4, two at the forward end of the car 3 and two at the rear end of the said car, the several units 4 and the car 3 being connected together by quickly detachable tension and thrust couplings. The remainder of the train as exemplified by the truck 6, indicated in dotted lines, is connected to one of the haulage units 4 in known manner. Each of the units 4 is adapted to receive power from the common power source through a shaft 7 which may be regarded as continuous, the drive preferably being taken from the power unit through a suitable gearing 8. The car 3 and the four units 4 constitute a complete locomotive or haulage unit. Hence, assuming that the power available is 100 H. P., it will be seen that the power is spread over twenty axles, each of which is capable of receiving and utilizing efficiently five H. P. at three miles per hour.

The power car 3 and each of the haulage units 4 is constituted by a body or chassis section which is supported on a pair of pony or bogie trucks 9 which are pivotally mounted relatively to the body or chassis and employ four wheels, each of which, in the case of the haulage units 4 is a driving wheel.

The weight which is necessary to be applied to the driving axles in order to give the required adhesion between the wheels and the rails is carried on the body or chassis, said body or chassis preferably being supported by a cross member which may be either rigid or in the form of a transverse spring, the cross member resting at its centre upon a pivot pin located centrally in the framing of the pony truck. The method of mounting the body is not illustrated or described in detail as it is not necessary to an understanding of the invention.

The pony or bogie trucks 9, one of which is shown in Fig. 2, are of identical construction and each comprises a frame 9ª provided with two pairs of depending diametrically opposed horn plates 9ᵇ, each pair of which serves to accommodate the ends of an axle 10, said axle being mounted in bearing blocks 11 adapted to slide within the guide provided by the arms of the horn plates 9ᵇ. A spring 12 is interposed between the underside of the frame 9ª and the top of the bearing guide for absorbing the shock due to the unevenness of the track 13 and other causes.

Secured centrally on each of said axles 10 is a worm wheel 14 adapted to mesh with a worm 15 formed on a shaft 16 rotatably mounted in ball bearings 17 carried by a housing 18 which serves to enclose the worm wheel 14, worm 15 and the said shaft 16. The shaft 16 is secured at its outer end within a sleeve 19ª carried by one of the spiders of a universal coupling 19 the other spider of which is provided with a sleeve 19ᵇ having a grooved inner periphery to receive and coact with the splined end 7ª of a section of the common power transmission shaft 7, which section of the shaft serves to connect the one pony truck with the cooperating pony or bogie truck 9 adjacent to it on either side.

The inner end 16ª of the shaft 16 is splined and adapted to engage with a correspondingly grooved sleeve 20, said sleeve also being engaged by the splined end 7ᵇ of an intermediate connecting section 7ᶜ of the shaft, the other end of the said section 7ᶜ being similarly connected to the shaft 16 carrying the worm 15 for driving the other axle of the pony or bogie truck. Alternatively the sleeves 20 may be employed for directly coupling the splined ends of the shaft 16 without the intermediate section 7ᶜ. The sleeves 20 are rotatably mounted within collars 21 secured to the housing 18, the outer periphery of each of the collars 21 serving as a bearing surface for the outer ends of a tubular member 22 which is disposed in the centre line of the body of the haulage unit, said tubular member 22 being capable of rotation and reciprocation relative to the said collars and permitting of a relative differential displacement of the axles due to different track conditions of each pair of wheels.

It will be seen that, by linking together worm-drives of the two axles of each bogie truck through a sleeve 20 and shaft 7ᶜ, a flexible intergearing of the two axles is provided, the sleeve 20 by its sliding relation to the shaft 16 and shaft section 7ᶜ and the slight play in its splined coupling with said parts serving to adapt the whole intergearing to changes in the relative positions of the two axles due to track conditions. It will also be apparent that the housings 18 cooperate with the tubular member 22 to form a sectional housing for such flexible gearing, the sliding connection between the tubular member 22 and collars 21 permitting the necessary "slip" in order that the housings may accommodate themselves to changes in relative positions of the axles.

The power from the power car 3 is transmitted to each of the axles 10 by means of the sections of the shaft 7, universal couplings 19, shafts 16, worms 15, and worm wheels 14; and it will be observed that the combination shaft 7 can be regarded as continuous throughout the length of the locomotive and forming a direct coupling between the axle of each of the driving units and the power source, the universal couplings 19 permitting the negotiation of curves and bends without imposing undue strain on the driving shaft 7. It will be appreciated that the number of haulage units 4 may be varied according to the tractive effort, the interconnection of the required number of units 4 being effected by simply engaging the projecting splined ends 7ª of the connecting section of the shaft 7 within the grooved sleeves 19ᵇ secured to the respective members of the universal couplings 19 and connecting together the tension and thrust coupling members in known manner, said couplings being of any known readily detachable kind.

Instead of arranging the haulage units 4 at each end of the power car 3 it will be appreciated that they may be disposed at one end only, the succeeding trucks 6 or trailer cars being attached to the haulage units 4 or power car in any known manner.

A locomotive or haulage system constructed as hereinbefore described admits of transmitting power developed by a common power source efficiently to any required number of driving axles, each with a tractive power output which is governed by and adapted to the strength and weight of the rail being utilized, thus making it possible to employ power units of much higher tractive powers on rails of light section than have hitherto been possible.

In a modification the pony trucks may be employed singly instead of in pairs, the load for securing the necessary adhesion between the wheels and the rails being carried on a platform secured to the framing of the truck.

Claims:

1. A locomotive or hauling apparatus, comprising a power car including a pair of pony trucks and a power unit mounted between said trucks, driving means for each axle of each truck including a shaft extending at a right angle to its associated axle, a driving connection between said power unit and the adjacent ends of the driving shafts of the adjacent axles, a shaft between the opposed ends of the drive shafts of each pony truck and sleeves, each of said sleeves surrounding and forming a drive means between one end of said shaft and the adjacent end of one of the axle driving shafts, said sleeves permitting relative movement between the axles of the pony truck with which it is associated.

2. A locomotive or hauling apparatus, comprising a power car and a haulage unit, said power car including a power unit and a pair of pony trucks, one of said trucks being located ahead of said power unit and the other of said trucks being located behind said power unit, said haulage unit comprising a pair of pony trucks, a separate driving means for each axle of each of said pony trucks including a shaft extending in the direction of the length of the truck with which it is associated, a shaft between the opposed ends of said first-named shafts, sleeves each surrounding and having splined connection with one end of said last-named shaft and the adjacent end of one of the axle driving shafts of each pony truck and permitting relative movement between the axles of the truck with which it is associated, drive means between the power unit and the adjacent end of the axle driving shaft of each of the immediately adjacent axles of the pony trucks of the power car, a universal coupling between the adjacent ends of the axle driving shafts of each of the pony trucks of the haulage car, and a driving connection including a universal joint between the adjacent ends of the driving shafts of the adjacent pony trucks of said power car and of said haulage unit.

3. A locomotive or hauling apparatus, comprising a train of pony trucks, each of said trucks comprising a pair of axles and a pair of driving wheels carried on each of said axles, a drive shaft associated with each of said axles and each having at one end means comprising a universal coupling for connecting same to one end of a drive shaft of an adjacent pony truck, a shaft between the opposed ends of the drive shafts of each pony truck, sleeves each embracing and having driving connection with one end of said last-named shaft and the adjacent end of one of the drive shafts of each truck and permitting relative movement of the axles of said truck, and a power unit having driving connection with the drive shaft of the axle of one of said trucks.

4. A locomotive or hauling apparatus, comprising a plurality of pony trucks each having a pair of axles rotatably and resiliently mounted thereon, a worm wheel mounted on each of said axles, a casing embracing each of said worm wheels, an axle driving shaft and a worm carried thereby mounted to rotate in each of said casings, each of said worms meshing with one of said worm wheels, driving members including universal joints connecting the axle driving shafts of adjacent trucks, a shaft between the opposed ends of the axle driving shafts of each truck, sleeves each embracing and splined to one end of said shaft and the adjacent ends of the axle driving shafts of each truck and permitting differential displacement of said axles incident to different track conditions, a power unit associated with one of said trucks, and a driving connection between said power unit and one of the axle driving shafts of said truck.

5. A locomotive or hauling apparatus, comprising a series of pony trucks, means interconnecting the axles of each truck and comprising sections extending at a right angle to the axes of rotation of said axles, sleeves surrounding the abutting ends of said sections and having splined connection with the latter to permit relative longitudinal movement of said sections and differential movements of said axles, a driving means flexibly and separably connecting the adjacent ends of the axle interconnecting means of each pair of trucks, a power unit mounted on a pair of said trucks, and driving connections between said power unit and the axle interconnecting means of the trucks on which it is mounted.

In testimony whereof I have hereunto set my hand.

ALFRED EDWIN DAVIS.